UNITED STATES PATENT OFFICE.

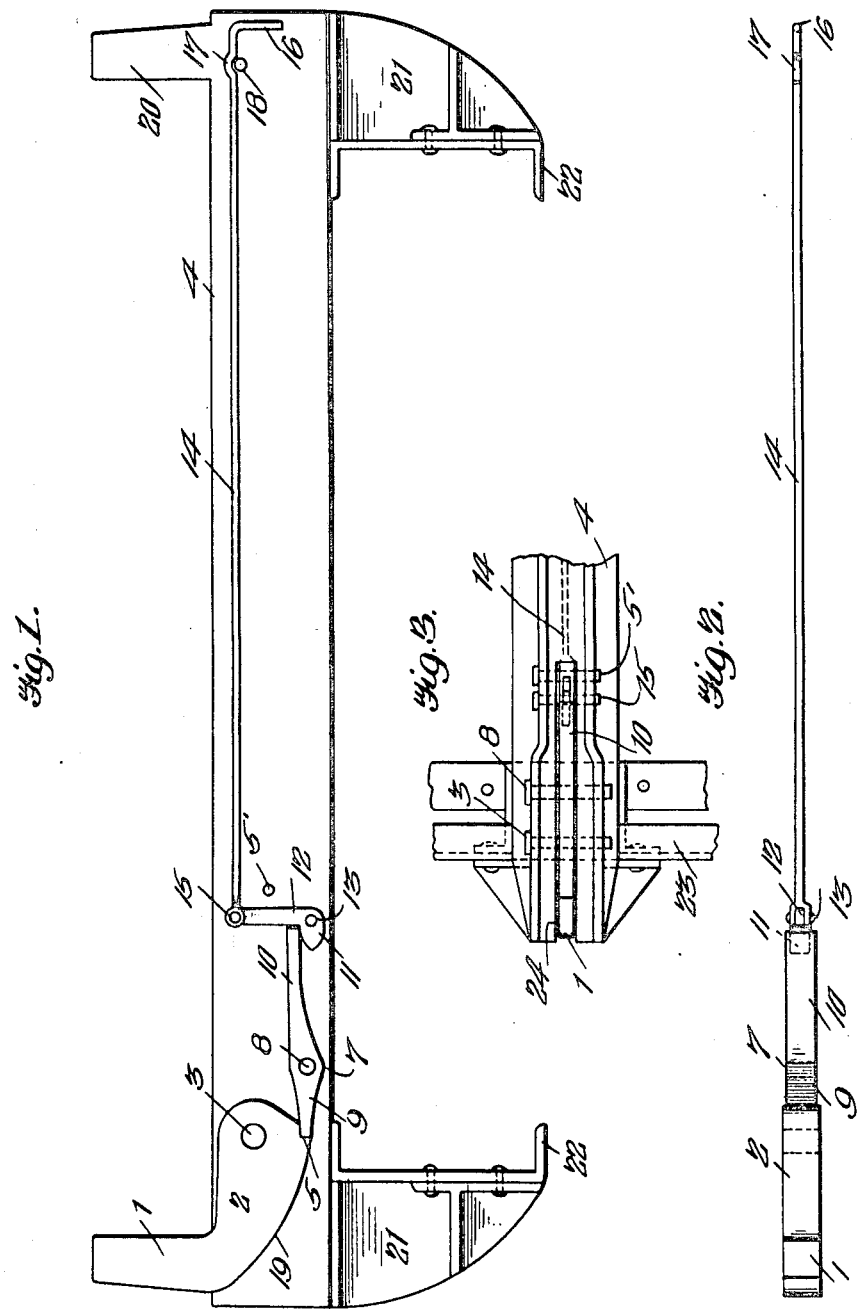

BENJAMIN THOMAS HARROP, OF WINNFIELD, LOUISIANA.

LOG-STAKE.

1,079,172.  Specification of Letters Patent.  Patented Nov. 18, 1913.

Application filed August 29, 1913. Serial No. 787,329.

*To all whom it may concern:*

Be it known that I, BENJAMIN T. HARROP, a citizen of the United States, and a resident of Winnfield, in the parish of Winn and State of Louisiana, have invented a new and useful Improvement in Log-Stakes, of which the following is a specification.

My invention is an improvement in log stakes, and has for its object to provide a stake of the character specified, for holding logs in piled or superposed condition on a car or other support, so arranged that the stake will fall by gravity below the surface of the bunk commonly used on railroad cars for transporting logs, wherein the stake is so arranged that it will operate from the side opposite that from which the car is being unloaded, and wherein the mechanism is inclosed within the steel walls of the bunk, thereby preventing injury from the logs during loading or unloading.

In the drawings: Figure 1 is a side view of a bunk having the improved stake, and showing the stake in vertical position, Fig. 2 is a top plan view of the mechanism connected with the movable stake detached from the bunk, and Fig. 3 is a partial plan view of the bunk.

In the present embodiment of the invention, the stake 1 is provided at its lower end with a laterally extending lug 2, having an opening for receiving a pivot pin 3, to pivotally connect the stake to the bunk 4. The lug 2 is notched or recessed as indicated at 5, directly below the pivot pin 3 when the stake is in upright position, the notch or recess forming a stop for engagement by one end of a locking lever, to be described.

The locking lever is provided with a central bearing 7, journaled upon a pivot pin 8, connected with the bunk, and the said lever has a short arm 9, extending toward the stake, and a long arm 10 extending in the opposite direction. The free end of the short arm is adapted to engage the stop 5 on the stake to lock the stake in upright position, and the opposite end 10 of the lever lies, when the lever is in locking position directly above an angular lug 11, on the trip lever 12. The said lever is pivoted to the bunk, by means of a pivot pin 13, the said pin passing through an opening in the lever at the junction of the said lever with the lug. One end of a link or rod 14 is pivotally connected to the end of the lever remote from the lug 11, by means of a pivot pin 15, and the opposite end of the link or rod is provided with a handle 16, depending from the link at approximately a right angle.

Adjacent to the handle a portion of the link or rod is offset laterally to form a transverse groove 17, for engagement by a stop pin 18, extending laterally from the bunk to hold the link in inoperative position. The link or rod 14 extends transversely of the car, to the opposite side thereof from the stake to the operator.

When it is desired to release the stake, the operator releases the free end of the link 14 from the stop pin 18 and draws the link toward the side of the car upon which he stands. As the lever 12 swings, the lug 11 engages the free end of the arm 10 of the lever 9—10, elevating the said end, and pressing the free end of the arm 9 downwardly. As soon as the free end of the arm 9 of the lever 9—10 is disengaged from the stop 5 of the stake, the weight of the stake will cause the same to swing downwardly into inoperative position. The stake will swing by gravity, since the pivot pin thereof is offset laterally from the long axis of the stake.

The stake may be locked in elevated position, merely by raising the same into such position. The arm 10 of the lever 9—10 is of greater length and heavier than the arm 9, so that the lever normally tends to take a locking position.

It will be noticed that the lower surface of the lug 2 of the stake is cam shaped as shown at 19, and when the lever is being returned to upright position, the said cam surface 19 will engage the upper side edge of the locking lever 9—10, and will swing the arm 10 of the said lever upwardly, until the free end of the arm 9 passes over the stop 5, when the lever will immediately drop into locking position.

The bunk 4 is secured to the car for supporting the log, and the locking and operating mechanism for the stake is below the upper edge of the bunk and as a consequence below the level of the logs, so that the said logs cannot interfere with the operation of the said locking and releasing mechanism. At the opposite side of the bunk, a fixed stake 20 is provided, for supporting the logs at the said opposite side of the car. The bunks are arranged transversely of the cars, and it will be evident that as many stakes may be provided as may be desired. A stop 5' is provided for limiting the swinging movement of the lever 12 away from the movable stake, the said stop being in the form of a pin connected with the bunk.

The logs are piled on the bunks in the form of a pyramid, the outermost logs of the bottom layer engaging the stakes 1 and 20. Each layer of logs is of lesser width than the next layer, and the load may be held on the car by chains, if desired.

It will be noticed from an inspection of Fig. 3, that the bunk is provided with depending bracket arms 21, which engage the sides of the car 23, (Fig. 3) to secure the bunk thereto. Each arm is provided with an inwardly extending lug 22 at its lower end for engaging beneath the adjacent side of the car. The ends of the bunk as shown in Fig. 3, extend beyond the sides of the car, so that when the stake 1 is released, the logs will roll off the ends of the bunk instead of off the sides of the car. The stakes 1 and 20 are of sufficient height only to engage the outermost logs of the lowermost layer of logs, and the stake 1 will swing downwardly through a slot or passage 24 in the bunk, as shown in Fig. 3, and will thus be out of the way, and in no danger from the rolling logs.

I claim:—

1. In combination with the bunk having at one end thereof a fixed stake, of a movable stake at the opposite end, said stake having a lateral inwardly extending lug, a pivotal connection between the lug at the end remote from the stake and the bunk for permitting the said stake to swing downward by gravity, said lug being notched below the pivotal connection to form a stop approximately perpendicular to the pivotal connection, a locking lever comprising a long arm and a short arm pivoted adjacent to the stop, the short arm extending toward the stop and being adapted to engage the same to hold the lever in upright position, said lever having a cam surface for engagement by the said short arm of the lever to press the said short end downwardly when the stake is swung to upright position, a trip lever pivoted at the outer end of the long arm of the locking lever and having a lug extending laterally below the free end of the said long arm, and an operating lever pivoted at one end to the said releasing lever and extending toward the opposite end of the bunk, said link having a handle and having a transverse groove on its under face adjacent to the handle, and a stop on the bunk for engagement by the groove.

2. In combination with the bunk having at one end thereof a fixed stake, of a movable stake at the opposite end, said stake having a lateral inwardly extending lug, a pivotal connection between the lug at the end remote from the stake and the bunk for permitting the said stake to swing downward by gravity, said lug being notched below the pivotal connection to form a stop approximately perpendicular to the pivotal connection, a locking lever comprising a long arm and a short arm pivoted adjacent to the stop, the short arm extending toward the stop and being adapted to engage the same to hold the lever in upright position, said lever having a cam surface for engagement by the said short arm of the lever to press the said short end downwardly when the stake is swung to upright position, a trip lever pivoted at the outer end of the long arm of the locking lever and having a lug extending laterally below the free end of the said long arm, and means at the opposite end of the bunk for swinging the trip lever to release the locking lever.

3. In combination with the bunk having at one end thereof a fixed stake, of a movable stake at the opposite end, said stake having a lateral inwardly extending lug, a pivotal connection between the lug at the end remote from the stake and the bunk for permitting the said stake to swing downward by gravity, said lug being notched below the pivotal connection to form a stop approximately perpendicular to the pivotal connection, a locking lever comprising a long arm and a short arm pivoted adjacent to the stop, the short arm extending toward the stop and being adapted to engage the same to hold the lever in upright position, said lever having a cam surface for engagement by the said short arm of the lever to press the said short end downwardly when the stake is swung to upright position, and means operable from the opposite end of the bunk for releasing the locking lever.

4. In combination with the bunk having at one end thereof a fixed stake, of a movable stake at the opposite end, said stake having a lateral inwardly extending lug, a pivotal connection between the lug at the end remote from the stake and the bunk for permitting the said stake to swing downward by gravity, said lug being notched below the pivotal connection to form a stop approximately perpendicular to the pivotal connection, a locking lever comprising a long arm and a short arm pivoted adjacent to the stop, the short arm extending toward the stop and being adapted to engage the same to hold the lever in upright position, and means operable from the opposite side of the car for releasing the locking lever.

5. In combination with the bunk having at one end a fixed stake, of a movable stake at the opposite end of the bunk, said stake having a central inwardly extending lug and a pivotal connection between the lug and the bunk for permitting the stake to swing downward by gravity, normally active means for holding the stake in upright position, and means operable from the opposite side of the car for engaging and positively releasing the said holding means.

6. In combination with the bunk, of a movable stake pivoted to one end thereof, the pivotal connection being lateral to the stake to permit the stake to swing downwardly by gravity, normally active means for holding the stake in upright position, and means for engaging and positively releasing the holding means.

BENJAMIN THOMAS HARROP.

Witnesses:
T. I. JORDAN,
J. MENSCH.